United States Patent [19]

Kukesh

[11] Patent Number: 5,570,839
[45] Date of Patent: Nov. 5, 1996

[54] PLURAL COMPONENT FLOW MONITORING SYSTEM

[75] Inventor: Timothy S. Kukesh, Indianapolis, Ind.

[73] Assignee: Glas-Craft, Inc., Indianapolis, Ind.

[21] Appl. No.: 396,280

[22] Filed: Feb. 28, 1995

Related U.S. Application Data

[63] Continuation of Ser. No. 189,316, Jan. 31, 1994, abandoned.

[51] Int. Cl.$^6$ ........................................................ B05B 7/04
[52] U.S. Cl. .............................. 239/61; 239/72; 239/414
[58] Field of Search .................................. 239/61, 68, 71, 239/72, 74, 414; 222/39, 23, 334, 137, 283, 134; 137/557, 494

[56] References Cited

U.S. PATENT DOCUMENTS

| | | |
|---|---|---|
| 3,096,225 | 7/1963 | Carr et al. . |
| 3,111,272 | 11/1963 | Underdown et al. . |
| 3,126,157 | 3/1964 | Dickerson . |
| 3,185,396 | 5/1965 | Black . |
| 3,330,484 | 7/1967 | Johnson et al. . |
| 3,542,296 | 11/1970 | Bradley . |
| 3,676,197 | 7/1972 | Harrison et al. . |
| 3,780,942 | 12/1973 | Scharfenberger . |
| 3,876,145 | 4/1975 | Gusmer et al. . |
| 3,927,833 | 12/1975 | Harrison et al. . |
| 4,023,733 | 5/1977 | Sperry . |
| 4,176,617 | 12/1979 | Pilipski ............................. 137/557 X |
| 4,204,612 | 5/1980 | Schrader et al. ........................ 239/61 |
| 4,430,886 | 2/1984 | Roud ...................................... 239/71 X |
| 4,470,367 | 9/1984 | Bergeron ............................. 137/557 X |
| 4,789,100 | 12/1988 | Senf ..................................... 239/68 X |
| 4,809,409 | 3/1989 | Kukesh ................................ 239/74 X |
| 4,824,017 | 4/1989 | Mansfield . |
| 4,917,296 | 4/1990 | Konleczynski ........................ 239/71 X |
| 4,967,956 | 11/1990 | Mansfield . |
| 5,080,283 | 1/1992 | Kukesh et al. . |
| 5,316,217 | 5/1994 | Guzowski et al. ........................ 239/71 |

FOREIGN PATENT DOCUMENTS

| | | | |
|---|---|---|---|
| 350605 | 1/1990 | European Pat. Off. ................. | 239/68 |

OTHER PUBLICATIONS

*Fiberglass and Urethane Foam Equipment and Accessories,* Glas–Craft Product Catalog, 1988 1/2.
*Extender Dry Spray System,* ECI product brochure.
*Model CG Gun,* Gusmer Corporation product brochure.
*Model AR Gun,* Gusmer Corporation product brochure.

*Primary Examiner*—Andres Kashnikow
*Attorney, Agent, or Firm*—Brinks Hofer Gilson & Lione

[57] ABSTRACT

A plural component dispensing system includes flow monitoring system to interrupt operation and/or provide an audible and/or visual warning signal to an operator if the flow of one component of a plural component material stops or reaches an unacceptable value. In the flow monitoring system, a pilot valve can be connected with a pressure generated to indicate the flow of the monitored component, and with an adjustable pressure indicative of acceptable/unacceptable flows, and can provide an output to interrupt system operation in the event of an unacceptable flow of the monitored component. In systems of the invention where operation is not interrupted, a warning signal can alert the operator to discontinue dispensing the plural component material until the cause of the unacceptable flow condition has been investigated and corrected.

15 Claims, 6 Drawing Sheets

PLURAL COMPONENT FLOW MONITORING SYSTEM

This application is a continuation of application Ser. No. 08/189,316 filed Jan. 31, 1994, now abandoned.

The present invention relates to plural component material dispensing systems, and particularly to systems for protecting against an unacceptable flow or stoppage of one of the components of the plural component material. More particularly, the invention relates to monitoring and sensing systems that interrupt operation and/or provide a warning to an operator when the system senses unacceptable flow of a component such as a curing agent or catalyst.

BACKGROUND

Plural component dispensing systems are used in many manufacturing applications. For example, plural component spraying systems have been used in manufacturing plastic articles by applying resinous materials to a mold or a preform for the article. In such systems, a liquid resin and a catalyst for the resin are formed into spray particles directed to a substrate where the catalyst and resin react and harden to form the articles. In such applications, two components, for example, a resin and a catalyst, are mixed together, either internally or externally of a sprayer, and the mixture is applied on the substrate.

Plural component fluid dispensing systems have also been used, for example, in the manufacture of insulating foams. In such systems, first and second liquid components, for example, a polyol resin and an isocyanate, are mixed and after mixing dispensed or sprayed into or onto an article of manufacture where the mixed components react to produce a hardened insulating foam.

More recently, plural component painting systems have been developed that apply plural liquid fluid components that react, when mixed, to form hardened, decorative and protective coatings. Other applications for plural component dispensing systems are continuing to arise with the development of new plural component materials.

Plural component dispensing systems for plural component materials are divided generally into two categories, those in which the multiple components are mixed externally to the system apparatus (referred to as external mix systems) and those in which the plural components are mixed within the system apparatus (referred to as internal mix systems). In both external mix and internal mix systems, it is important that the components be supplied for mixing at the precise ratios recommended by the plural component material manufacturers for curing the mixed plural component material. In addition, fluid dispensing systems should be adjustable to vary widely the ratios between the fluid components of the plural component material; for example, plural component fluid dispensing systems must be capable of mixing and dispensing materials with ratios from 1:1 to as high as about 16:1.

Compressed air is generally available in manufacturing facilities for the operation of various power-driven hand tools that are frequently used in manufacturing operations. It is convenient and desirable that liquid dispensing systems be adapted to operate from such compressed air, which is frequently referred to as "factory air". Thus, liquid delivery systems frequently include a control which is connected with the factory air, and flows of compressed air are directed and controlled by the liquid dispensing system control to operate and control valves and pumps of the liquid dispensing system.

The dispensers of plural component dispensing systems are generally supplied with the plural components by a plural component liquid delivery system which maintains the components separate and apart from each other until they are mixed. The plural component delivery systems frequently include first and second delivery tanks for storing supplies of the components to be mixed. Proportioning pumps are provided to deliver each component to the dispenser of the system at the precise desired flow volume.

In most systems, the proportioning pumps generally comprise positive displacement pumps, frequently reciprocating piston pumps, which are driven from a single air motor by a common interconnecting mechanism in a proportioning pump assembly. The proportioning pump assembly permits each of the positive displacement pumps to be mounted between an assembly base and the common mechanism in a variety of positions that provide variations in the ratio of the components as each of the component pumps is operated by the air motor through the common interconnecting mechanism. By varying the mechanical interconnection of each component pump between the base and the common interconnecting mechanism that drives the pump, each reciprocating piston of each proportioning pump can be driven through a different stroke length with each stroke of the air pump, and deliver different flow rates of each component.

The liquid dispensing system control can include a motor air control valve that is connected between the source of factory air and the air motor of the liquid dispensing system and is operable to control the flow of air to the air motor and thereby the operation of the positive displacement component pumps of the liquid delivery system. The liquid dispensing system control can also include, for example, a leak relay which controls the application of air pressure from the factory air source to the motor air control valve for operation of the motor air control valve and the air motor. Such a leak relay can be connected to the factory air source and through a small flexible hose with a small air valve on the dispenser so that by operation of the air valve by the system operator through actuation of a mechanical actuator such as a trigger, a flow of air can be established from the factory air source through the leak relay, which will operate the motor air control valve and thereby operate the air motor and component pumps. The mechanical actuator of the dispenser can also simultaneously operate a fluid valve or valves controlling the flow of the plural components through the dispenser for application by the system operator. Plural component dispensing systems frequently include an air driven actuator on the dispenser for operation of component flow control valves carried by the dispenser.

In some systems, the liquid delivery systems include heat exchangers and heated hoses to heat and maintain an elevated temperature of the components of a plural component material for delivery of the dispenser. In addition, some liquid delivery systems include components permitting the recirculation of the plural component materials, whether heated or unheated, between the dispenser and their sources.

Examples of systems like those described above are disclosed in U.S. Pat. Nos. 4,760,956; 4,809,909; 4,824,017; 5,080,283; and 5,178,326.

Preferably, plural component dispensing systems are intended to effectively and efficiently deliver, at substantially constant and preselected rates, all components of the plural component materials. Such systems would ensure the delivery of the correct ratio of components at the dispenser in order to dispense materials that provide a properly and completely cured article. However, actual operation of a plural component dispensing system sometimes results in conditions that vary the desired component flow ratio and can result in partially cured or uncured articles. It is important to avoid operation under such conditions and for an operator to be made aware of any unacceptable variation in the flow ratio of components so that the condition can be corrected while minimizing the amount and impact of uncured or partially cured articles. Such unacceptable changes in the flow ratio of the components can occur, for example, because of a blockage in the system or simply running out of one of the components of the plural component material. A plural component dispensing system that interrupts operations under such conditions or that provides an operator with an audible warning of an unacceptable flow or flow ratio or the ability to shutdown the system incoming air would be welcome by users of plural component dispensing systems.

SUMMARY OF THE INVENTION

According to the present invention, a system for dispensing or applying a plural component material comprises means for dispensing the plural component material, first means for delivering a flow of a first component to the dispensing means at a first pressure, second means for delivering a flow of a second component to the dispensing means, and means for monitoring and sensing the first pressure and generating a useful output when the first pressure falls below a predetermined value. The system can further include a source of compressed gas, and the monitoring and sensing means can include means for receiving pressure-regulated, compressed gas, the pressure of which is maintained at a predetermined value representing an unacceptable condition.

The monitoring and sensing means preferably includes a pilot valve that is movable between a first and a second position in response to changes of the first pressure relative to the predetermined value. Such a pilot valve can include means for receiving signal-generating compressed gas and means for porting a flow of signal-generating compressed gas to a warning device to generate an audible and/or visual signal when the first pressure falls below the predetermined value. Such a pilot valve can also provide, or operate means for generating, an interrupt signal to interrupt the flows of the first and second components in response to a reduction of the first pressure below the predetermined value.

By providing a system that permits the avoidance of operation in the event of unacceptable flow of one of the components of a plural component material, the present invention provides a considerable economic advantage to users of such a system. The system of the invention can stop, or alert an operator to stop, dispensing the plural component material when the flow of one component stops or reaches an unacceptable value, thus substantially reducing waste and improving the quality of the finished product.

Further features and advantages of the invention are set forth below in conjunction with the drawings and detailed description of a presently preferred embodiment of the invention.

DESCRIPTION OF A PRESENTLY PREFERRED EMBODIMENT OF THE INVENTION

The invention of this application includes a novel system for use in plural component dispensing systems to interrupt operation and/or provide an audible and/or visual warning signal to an operator if the flow of one component of a plural component material stops or reaches an unacceptable value. The output of the system of the invention is particularly important where the flow stoppage affects a curing agent of a plural component material, such as the catalyst in a resin-catalyst system. In systems of the invention where operation is not interrupted, a warning signal can alert the operator to discontinue dispensing the plural component material until the cause of the unacceptable flow condition has been investigated and corrected.

Figure 1:
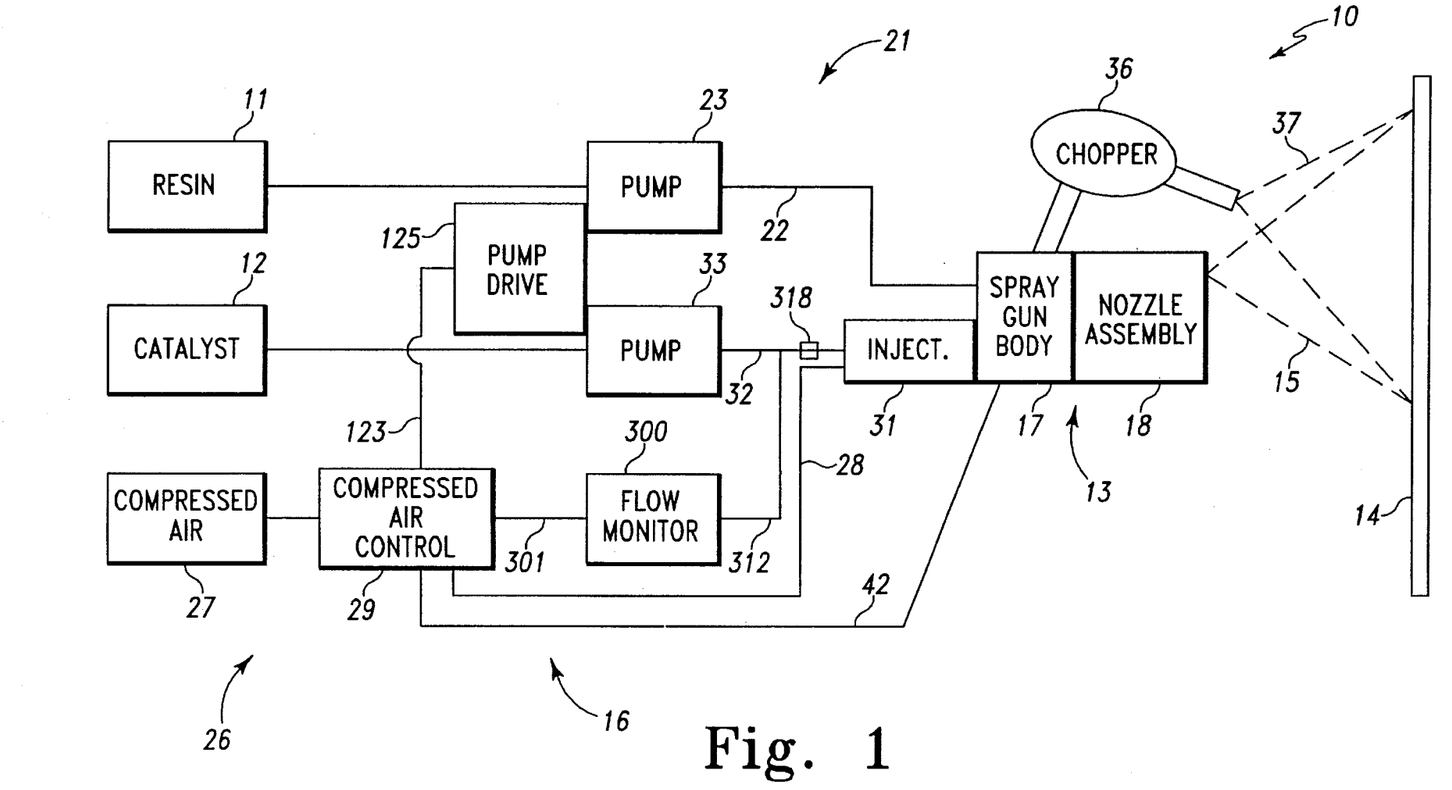
FIG. 1 is a schematic block diagram of one embodiment of a plural component dispenser system incorporating the invention.
Figure 2:
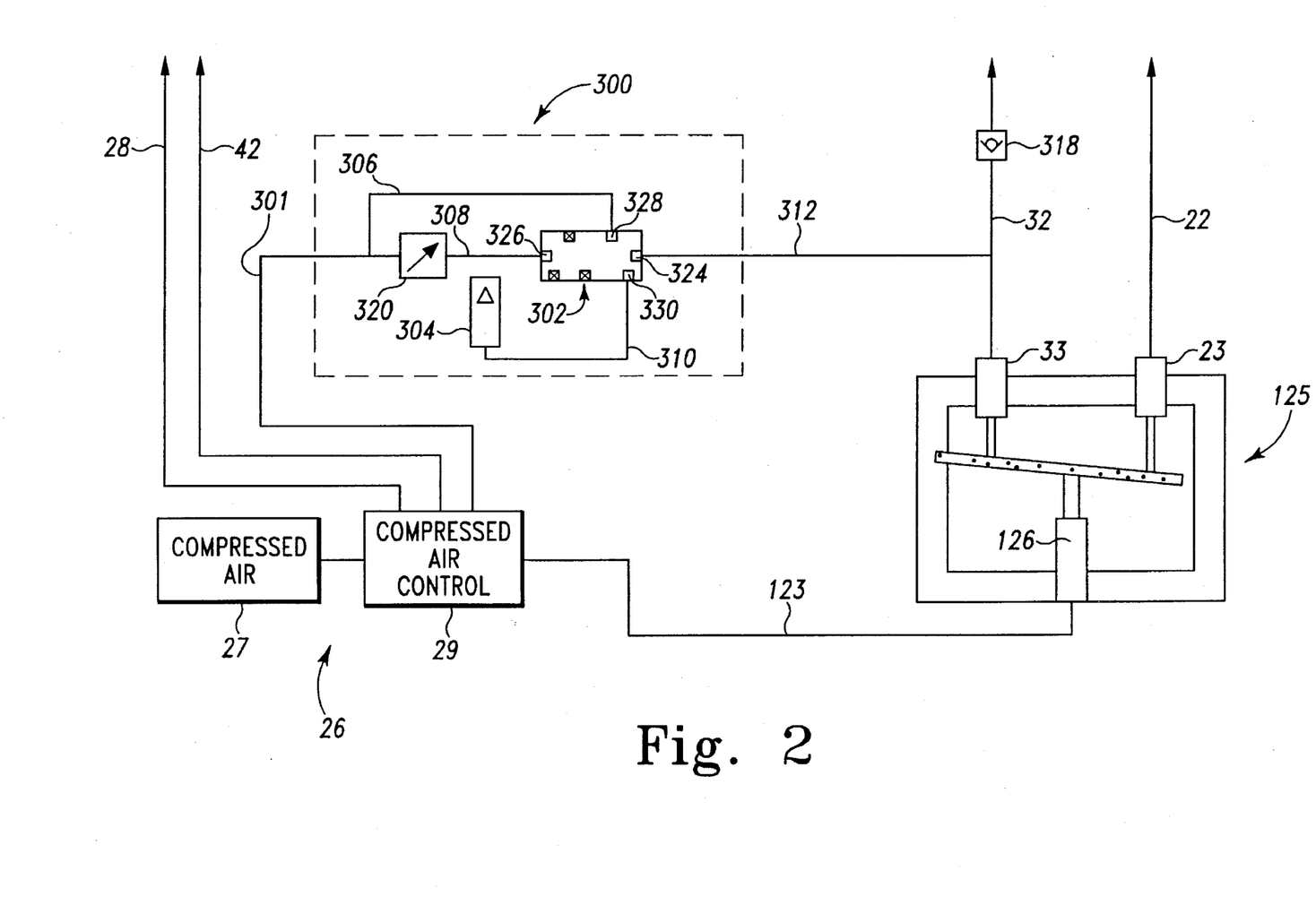
FIG. 2 is a schematic block diagram of an embodiment of a flow monitoring system of the invention including a pilot valve, illustrating its connection with one component of a plural component dispensing system.
Figure 3:
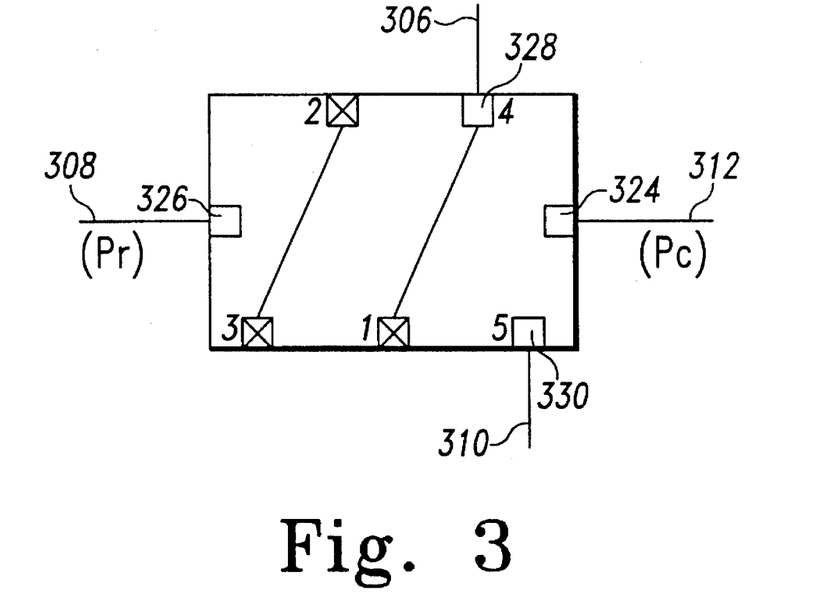
FIG. 3 is a schematic of the pilot valve of FIG. 2 in a first position.
Figure 4:
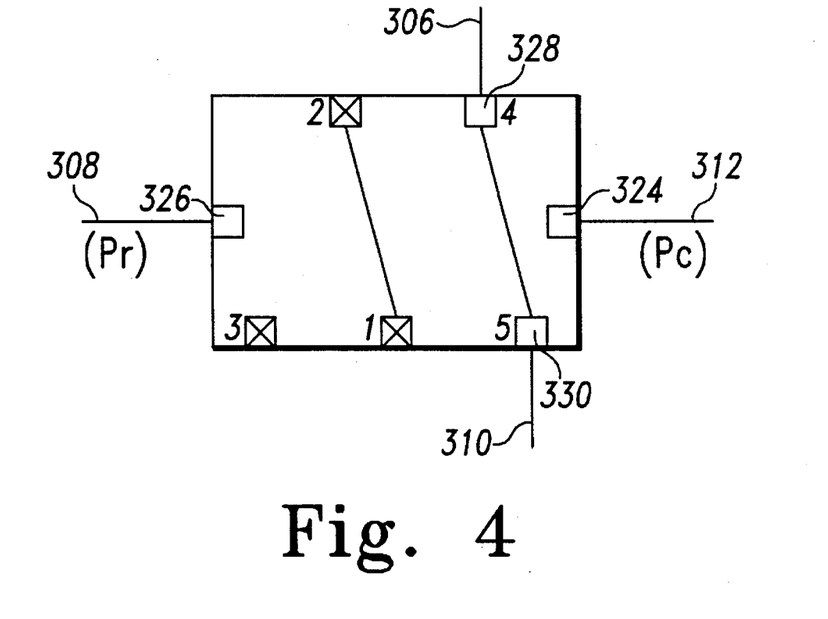
FIG. 4 is a schematic of the pilot valve of FIG. 2 in a second position.

FIGS. 1–4 illustrate a plural component fluid dispensing system of the invention, with FIG. 1 illustrating an external mix system of the invention in schematic block diagram form, FIG. 2 illustrating the invention in schematic form in greater detail and FIGS. 3 and 4 illustrating operation of one presently preferred embodiment of the present invention. Although FIG. 1 illustrates an external mix system, the invention may be incorporated into other systems, including internal mix spraying, pouring and dispensing systems, such as those disclosed in U.S. Pat. Nos. 4,760,956; 4,809,909; 5,080,293 and 5,178,326.

FIG. 1 schematically illustrates an external mix, air-assisted, airless atomization, plural component spraying system including the invention. The system is generally designated by reference numeral 10 and includes a first source 11 of a first component, e.g., a resinous material; a second source 12 of a second component, e.g., a catalyst for the resinous material; spraying means 13 for mixing the catalyst and resin and for directing the mixture at a substrate 14; and delivery means 16 for delivering the resin, catalyst, and other materials to the spraying means during operation of the system.

Spraying means 13 preferably comprises a hand-held spray gun which includes a spray gun body 17 with a nozzle assembly 18 at its front. Nozzle assembly 18, comprises an air-assisted, airless atomization nozzle assembly in which compressed air and liquid pressure are combined in the spraying of the resinous material. Such nozzle assemblies are described in U.S. Pat. No. 4,824,017. Thus, system 10 includes a compressed air source 27; and delivery means 16 includes air delivery means 26 for delivering compressed air to a compressed air control 29 for the system. In addition, a flow of resin from source 11 is delivered under pressure to spraying means 13 via liquid delivery means 21, which includes conduit 22 and pump 23.

Catalyst from source 12 is delivered to spraying means 13 by introduction into a controlled flow of compressed air from source 27. A controlled flow of compressed air through conduit 42 assists in atomization of the resin. Specifically, system 10 includes catalyst injection means 31, which receives catalyst under pressure from source 12 via conduit 32 and pump 33, and compressed air from source 27 via compressed air control 29 and conduit 28. Catalyst injection means 31 introduces the catalyst into the compressed air as a spray for delivery to the spraying means 13.

As known in the art, for example, U.S. Pat. No. 4,824,017, the flow of resin into spraying means 13 is directed through an airless liquid nozzle in nozzle assembly 18 which forms the resin flow into a fan-like film. The flow of catalyst-injected compressed air into spraying means 13 is directed through an air nozzle assembly 18 configured and positioned so that the compressed air will coact with the fan-like resin film externally of the spraying means, assist in atomization of the resin and, particularly, the tails of the fan-like spray schematically illustrated at 15 and in operation swept over substrate 14. Substrate 14 comprises an article-forming substrate such as a mold or preform used to manufacture articles from the catalyzed resin applied thereto. The resin can comprise any one of numerous materials such as a polyester or epoxy resin, and the catalyst comprises a material suitable for catalyzing the resin.

System 10 may include a chopper 36 mounted to spraying means 13 to dispense strands of fiberglass or the like into the spray pattern 15, as indicated at 37, to reinforce the plastic article and to act as a filler.

Component pumps 23 and 33 for the first and second components, respectively, are driven by common pump drive means 125 (FIG. 2) for delivering the components from the sources 11, 12 to the dispensing device 13 in ratios that can be changed by adjustment of the common pump drive means 125. Pumps 23 and 33 and pump drive means 125 are shown in greater detail in FIG. 2. As shown in FIG. 2 and described below, pump drive means 125 includes an air-driven motor 126 operated by compressed air through conduit 123 leading from the system control 29.

If desired, each component source can include a heating means (not shown) for lowering the viscosity of the components and raising the components to desired temperatures within the sources. Component sources 11 and 12 can frequently comprise the standard 55-gallon drums within which the components are normally shipped and stored.

As shown in FIG. 1 and described more fully below, the system 10 further includes a flow monitoring system 300 connected by an air conduit 301 with the compressed air control 29 and by a fluid conduit 312 with the conduit 32 for the output flow of pump 33. The flow monitoring system 300 monitors the flow of the component, which is preferably the plural component curing agent or catalyst. The flow monitor 300 can be connected at any position between the component pump 33 and the injector 31 at the dispensing device 13, but is preferably connected to the component conduit close to the pump and upstream of a check valve (see element 318 of FIGS. 1 and 2).

The component delivery systems for resin and catalyst are separate from one another and the liquid components do not come into contact with one another until after the components have reached the dispensing device 13 in internal mix systems, or have issued from the dispensing device 13 in external mix systems. If desirable, the first and second components may circulate through their respective delivery systems.

FIG. 2 is a schematic block diagram of a flow monitoring system 300 illustrating its use with a plural component dispensing system, such as those illustrated in FIG. 1. While FIG. 2 shows the flow monitoring system 300 to monitor the flow of only one component, both components of a system may be monitored, if desired. The system 300 includes a pilot valve 302, a warning whistle 304, air lines 306, 308, and 310, pressure regulator 320, and a fluid pressure conduit 312 providing a pressure signal from conduit 32. A 25 psi check valve 318 is positioned in conduit 32, downstream of the connection of conduit 32 with pressure line 312 and helps develop a pressure (Pc) in conduit 32 which is representative of the output of pump 33.

As shown in FIGS. 1 and 2, warning system 300 is connected via air line 301 through control 29 with a source of compressed air 27, which may be "factory air". Such factory air is typically compressed air having a pressure of, for example, 80 to 100 psi.

The factory air may be applied to one port 328 of the pilot valve 302 through air line 306 at full, unregulated, pressure, and through air line 308 at a reduced, predetermined and regulated, pressure (Pr) to input 326 of the pilot valve 302. The reduced, predetermined pressure is set by a pressure regulator 320 and can be adjusted to a value representing an unacceptable flow condition for the monitored component of the plural component material. The factory air source 27 also provides compressed air through control 29 and through air line 123 to operate an air motor 126 for actuating pump drive means 125 and through air lines 28 and 42 to operate the dispenser 13.

One suitable pilot valve 302 is the Compact Series L0702ABAA, manufactured by Automatic Valve of Novi, Mich., but, of course, other pilot valves can be used in the invention. Since maximum pressure at which this valve can operate is 125 pounds per square inch (psi), the flow monitor 300 is connected to the catalyst delivery system and conduit 32. In systems where one of the components is pumped at high pressure in excess of 125 psi for atomization, such as where resin is airlessly atomized, the component at high pressure cannot be monitored with this pilot valve.

The air pilot valve 302 includes a first pressure input 324 connected to pressure line 312 for receiving an indication of the output (Pc) of the component pump 33, and a second pressure input 326 connected to the predetermined pressure output (Pr) of the pressure regulator 320.

The output (Pc) provides an indication of the flow of the monitored component. As long as the component pump 33 is providing the monitored component to the dispenser 13 at the proper rate, pressure Pc remains at an "acceptable" level. When the flow of the monitored component decreases, as would occur when the source 12 runs out of catalyst, pressure Pc decreases. Thus, Pc in conduit 32 at the output of pump 33 provides an indication of the flow, or lack thereof, of the monitored component (e.g., catalyst) to the dispenser 13.

As shown in FIGS. 3 and 4, the pilot valve 302 has five ports, three of which, ports 1, 2 and 3, are blocked Port 4 which is connected to conduit 306 is air inlet port 328 and port 5 is air outlet port 330. The air pilot valve 302 has two positions, as shown in FIGS. 3 and 4. Air inlet port 328 receives the unregulated factory air through line 306, and air outlet port 330 is connected to air line 310. So long as there is an acceptable output flow of the component pump 33, pressure Pc is greater than the predetermined pressure Pr, which has been adjusted to provide an input at port 326 representing the borderline between acceptable and unacceptable operation; the air pilot valve 302 remains in the first position; and air outlet port 330 is isolated from the air inlet port 328, as shown in FIG. 3. When the output flow from the component pump 33 falls significantly below an acceptable level, the pressure Pc falls significantly below the predetermined pressure Pr, and the air pilot valve 302 moves to the second position and internally connects the air inlet and outlet ports 328, 330, as shown in FIG. 4. Unregulated factory air is then free to pass through the air line 310 to operate a control device and/or a warning device. As shown in FIG. 2, a whistle 304 can be operated to provide an audible warning to an operator that the monitored component (e.g., catalyst) is no longer being supplied to the dispenser 13. Thus, when the flow of a catalyst to a dispenser 13 falls below a minimum acceptable level, as determined by the adjustable predetermined pressure Pr, the air pilot valve 302 automatically routes compressed air to a whistle to alert the operator by an audible signal. As a consequence, the operator's attention can be devoted to the proper application of the plural component material, ensuring better quality with less waste.

Figure 5:
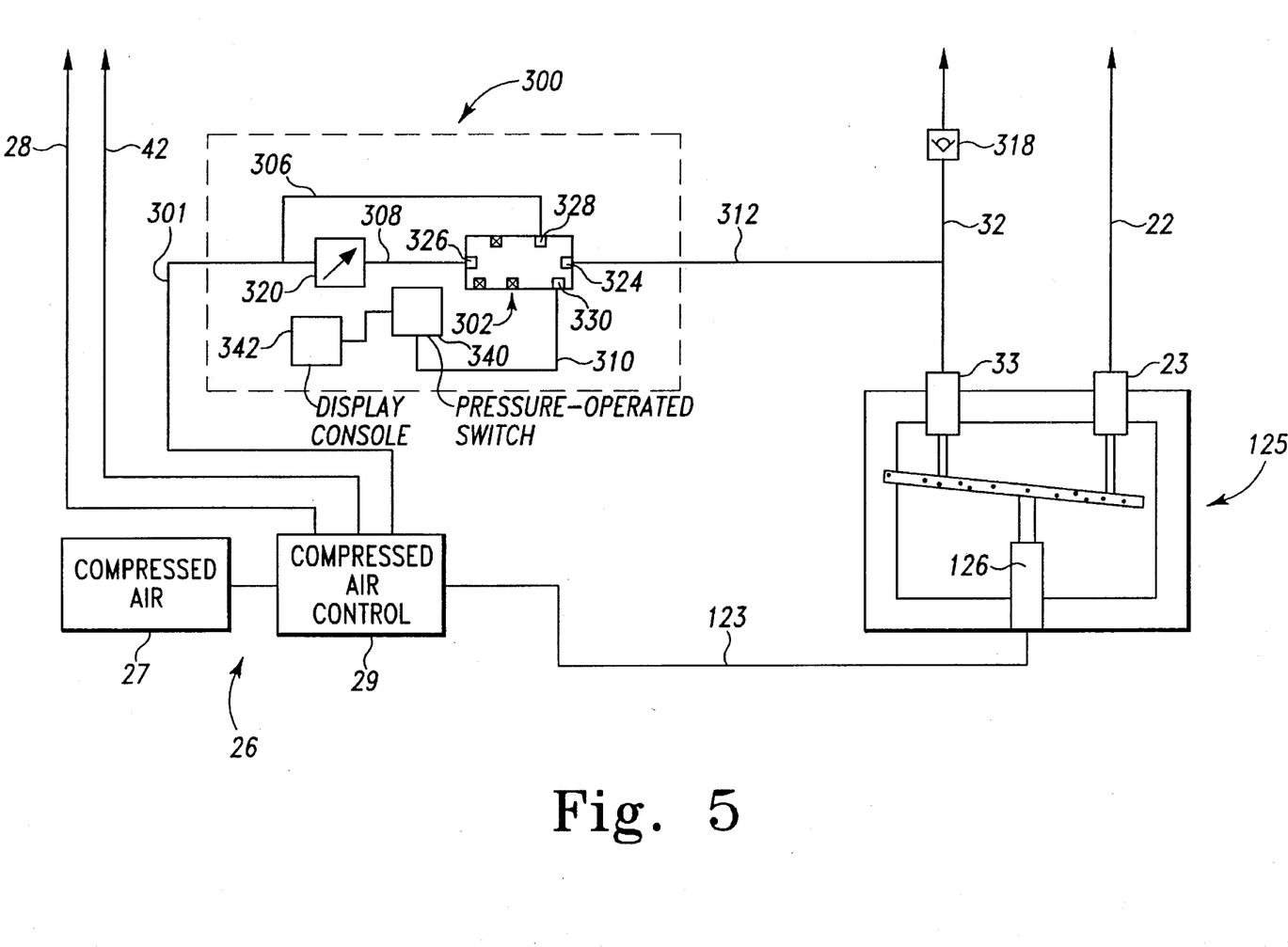
FIG. 5 is a schematic block diagram of an alternative embodiment of the flow monitoring system of FIG. 2 illustrating a pressure-operated switch for generating electrical signals to provide a visual warning on a display.
Figure 6:
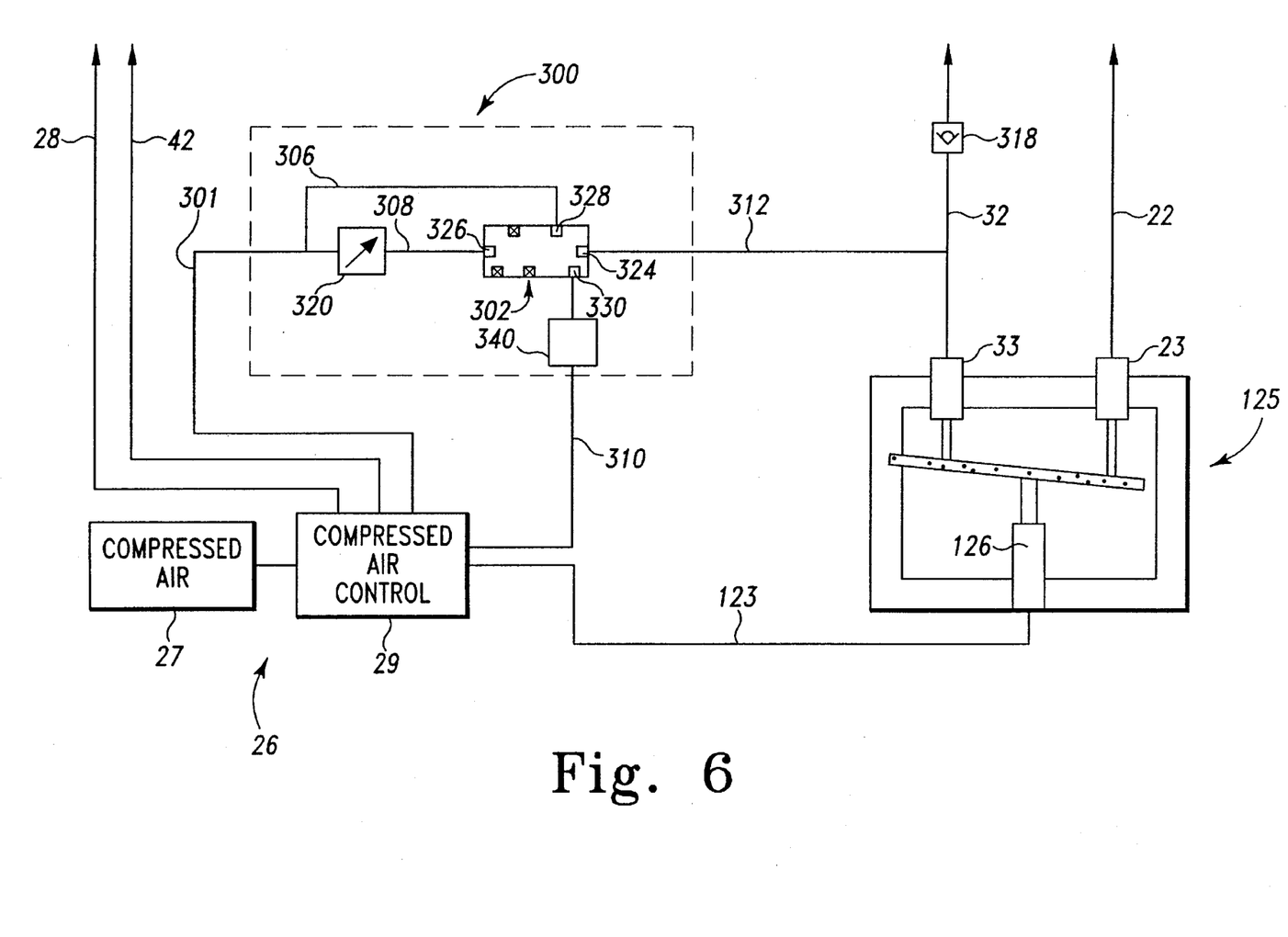
FIG. 6 is a schematic block diagram of an alternative embodiment of the flow monitoring system of FIG. 2 illustrating a pressure-operated switch for generating an electrical signal to close a valve in a compressed air control.
Figure 7:
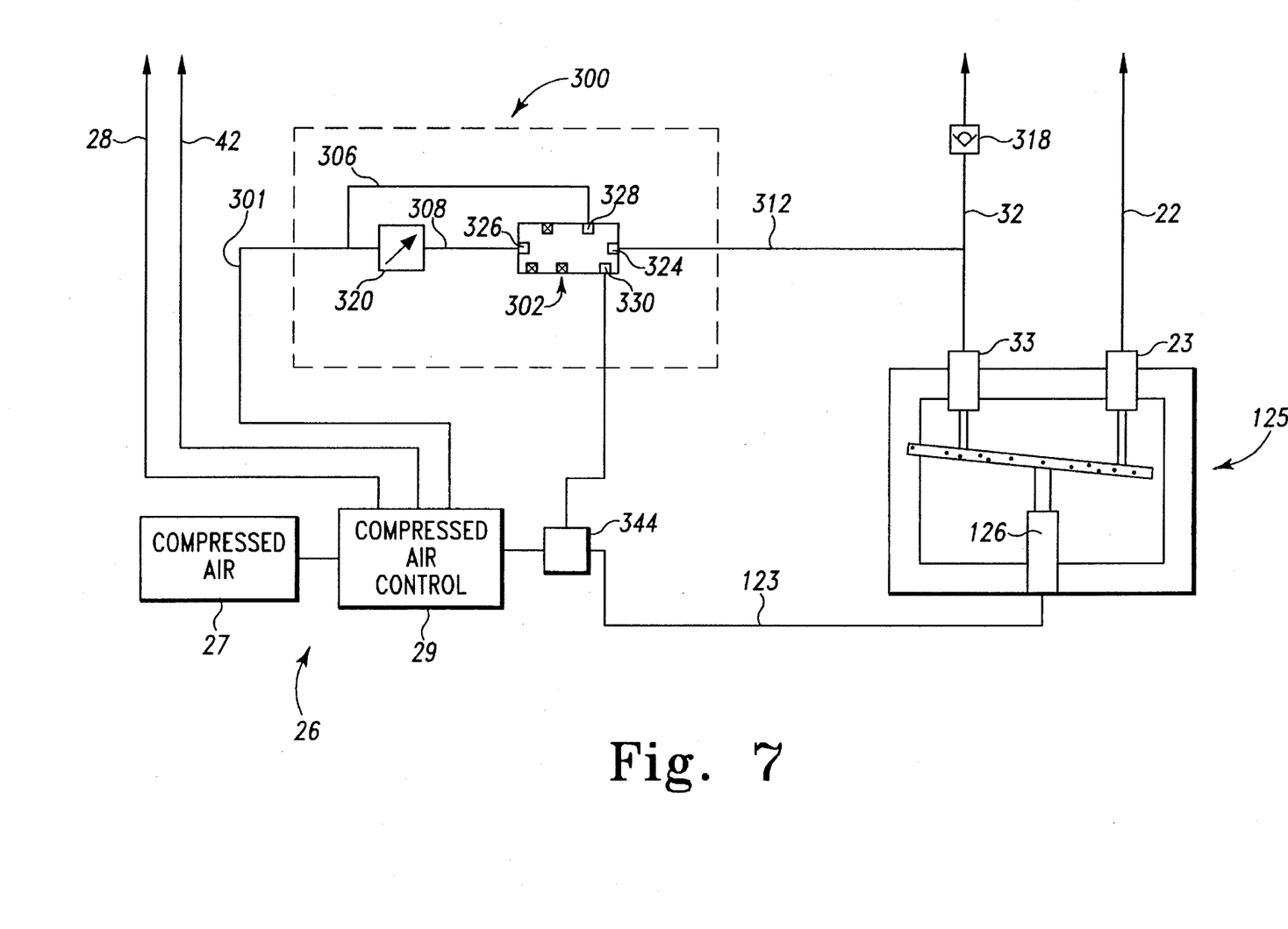
FIG. 7 is a schematic block diagram of an alternative embodiment of the flow monitoring system of FIG. 2 illustrating a separate pressure-operated valve placed in a conduit to interrupt operations.

The movement of the air pilot valve 302 to the second position (FIG. 4) can also generate other signals. For example, the whistle 304 of FIG. 2 can be replaced with a pressure-operated switch 340 (FIG. 5) to generate electrical signals. Such electrical signals can be used to provide a visual warning, such as a flashing light or a message presented on a display console 32 (FIG. 5), or to close a valve in control 29 leading to conduit 123 (dashed line 304a in FIG. 6) to interrupt the flow of compressed gas to the air motor 126 in order to stop the flow of the first and second components. Also, the whistle 304 can be replaced with a separate pressure-operated valve 344 (FIG. 7) that is placed in conduit 123 to interrupt operations.

Although the invention has been described in detail with reference to a certain preferred embodiment, variations and modifications exist within the scope and spirit of the invention as set forth in the following claims.

I claim:

1. A system for applying a plural component material, the system comprising:

application means for dispensing the plural component material, first means including a pump for delivering a flow of a first component of the plural component material to the application means at a first pressure, said first means generating said first pressure representing the rate of flow of said first component, second means for delivering a flow of a second component of the plural component material to the application means, means for sensing the first pressure and generating a signal when the rate of flow of said first component falls below a predetermined value at a point between the pump and the application means;

a source of compressed gas; and an adjustable pressure regulator for said compressed gas, wherein the sensing means further includes means for receiving pressure-regulated compressed gas from said adjustable pressure regulator, the pressure of the pressure-regulated gas being adjustable to a predetermined value related to the rate of flow of the first component.

2. The system of claim 1, wherein the sensing means is movable between a first and a second position in response to changes of the first pressure relative to the predetermined value to generate the signal.

3. The system of claim 2, wherein the sensing means includes a pilot valve, said pilot valve including means for receiving a signal-generating compressed gas from said source of compressed gas, and means for porting a flow of the signal-generating compressed gas to a warning device to generate an audible signal when the first pressure falls below the predetermined value.

4. The system of claim 1, wherein the sensing means further includes means for receiving a pressure-regulated flow of compressed gas, the pressure of the pressure-regulated flow being adjustable to and maintained at the predetermined value, and means for generating an interrupt signal to interrupt the flows of the first and second components in response to a reduction of the first pressure below the predetermined value.

5. The system of claim 1 wherein said first means includes a valve for generating said first pressure representing the rate of flow of the first component at said point between said valve and said pump.

6. The system of claim 5 wherein said valve is a check valve.

7. A system for dispensing a plural component material, comprising:

means for dispensing the plural component material, first means for delivering a first component of the plural component material to the dispensing means at a first flow rate, said first means providing an output representing said first flow rate and including means for generating a pressure output having a value indicative of the first flow rate, second means for delivering a second component of the plural component material to the dispensing means, and means for monitoring the output representing said first flow rate said monitoring mean being adapted to receive an adjustable input related to an acceptable predetermined value of flow rate and generating an output signal when the first flow rate falls below the predetermined value and the monitoring means includes means for setting an adjustable input pressure to indicate the predetermined value, means for receiving the pressure output from the first means, means for comparing the pressure output having a value indicative of the first flow rate from the first means with the adjustable input pressure to indicate the predetermined value, and a pilot valve connected to a warning device and configured to receive the pressure output from the first means and a flow of compressed gas, the pilot valve comprising means for porting the flow of compressed gas to the warning device in response to a reduction in the pressure output below the predetermined value, the monitoring means being movable from a first position to a second position in response to a reduction in the pressure output indicative of the first flow rate below the predetermined value.

8. The system of claim 7, wherein the pilot valve further comprises means for porting the flow of compressed gas to means for generating an interrupt signal to stop the flow of first and second components in response to a reduction in the first flow rate below the predetermined value.

9. In a plural component application system having an applicator and a source of resin and a source of resin-curing catalyst in fluid communication with the applicator in which a flow of resin is combined with a flow of resin-curing agent in the formation of solid resin, the improvement comprising a system for protecting against the flow of resin-curing agent falling below an acceptable value, said system including a signal-generating pilot valve comprising a first input connected with a first means for delivering the flow of resin-curing agent and a second input connected with means for generating an adjustable signal representing an acceptable value of flow of the resin-curing agent, said pilot valve further comprising a flow-directing valve member movable in response to a pressure differential between the first and second inputs for protecting against the flow of resin-curing agent falling below the acceptable value.

10. The plural component application system of claim 9 wherein said first means includes a check valve.

11. The plural component application system of claim 9 wherein the means for generating a signal representing the acceptable value of flow of resin-curing agent comprises a pressure regulator connected with a source of compressed air and providing an adjustable pressure at the second input of the signal-generating pilot valve representing the acceptable value of flow of the resin-curing agent.

12. The plural component application system of claim 9 wherein the flow-directing valve member is connected with a source of compressed air and provides a signal-generating flow of compressed air upon movement in response to a pressure differential between the first and second inputs.

13. The plural component application system of claim 12 wherein the signal-generating flow of compressed air operates a warning device.

14. The plural component application system of claim 12 wherein the signal-generating flow of compressed air operates a control to terminate operation of the plural component application system.

15. A system for dispensing in a plural component material, comprising:

means for dispensing the plural component material, first means for delivering a first component of the plural component material to the dispensing means at a first flow rate, said first means providing an output representing said first flow rate and, including a check valve for generating a pressure output having a value indicative of the first flow rate and a compressed gas pressure regulator for setting the adjustable input related to the acceptable predetermined value of flow rate, second means for delivering a second component of the plural component material to the dispensing means, and means for monitoring the output representing said first flow rate said monitoring means being adapted to receive an adjustable input related to an acceptable predetermined value of flow rate and generating an output signal when the first flow rate falls below the predetermined value.

* * * * *

UNITED STATES PATENT AND TRADEMARK OFFICE
CERTIFICATE OF CORRECTION

PATENT NO. : 5,570,839
DATED : November 5, 1996
INVENTOR(S) : Timothy S. Kukesh It is certified that error appears in the above-indentified patent and that said Letters Patent is hereby corrected as shown below:

In Col. 4, line 51, delete "5,080,293" and insert therefor --5,080,283--.

In Col. 6, line 66, after "blocked", insert --.--; after "Port 4", insert --,--.

In Col. 6, line 67, after "306", insert --,--.

Signed and Sealed this

Thirteenth Day of May, 1997

*Attest:*

BRUCE LEHMAN

*Attesting Officer*  *Commissioner of Patents and Trademarks*